(12) United States Patent
Shannon et al.

(10) Patent No.: US 11,250,680 B2
(45) Date of Patent: *Feb. 15, 2022

(54) UTILIZING A HIGH GENERATION CELLULAR NETWORK FOR IDENTIFYING DEVICES ASSOCIATED WITH UNAUTHORIZED ACTIVITIES AND NOTIFYING ENTERPRISE FACILITIES

(71) Applicant: Bank of America Corporation, Charlotte, NC (US)

(72) Inventors: Stephen Thomas Shannon, Charlotte, NC (US); Brian Joseph Smith, St. Augustine, FL (US); James Alexander, Austin, TX (US)

(73) Assignee: Bank of America Corporation, Charlotte, NC (US)

( * ) Notice: Subject to any disclaimer, the term of this patent is extended or adjusted under 35 U.S.C. 154(b) by 13 days.

This patent is subject to a terminal disclaimer.

(21) Appl. No.: 16/881,074

(22) Filed: May 22, 2020

(65) Prior Publication Data
US 2021/0027592 A1 Jan. 28, 2021

Related U.S. Application Data

(63) Continuation of application No. 16/522,084, filed on Jul. 25, 2019, now Pat. No. 10,706,704.

(51) Int. Cl.
*G08B 13/00* (2006.01)
*G08B 13/22* (2006.01)
*H04W 4/029* (2018.01)
*G08B 3/10* (2006.01)

(52) U.S. Cl.
CPC ............... *G08B 13/22* (2013.01); *G08B 3/10* (2013.01); *H04W 4/029* (2018.02)

(58) Field of Classification Search
CPC . G06F 21/62; H04L 63/1408; G07F 17/3241; G07F 17/3223; G07F 17/3248; G08B 13/22
See application file for complete search history.

(56) References Cited

U.S. PATENT DOCUMENTS

| 9,788,211 | B2 | 10/2017 | Zhang |
| 9,961,624 | B1 | 5/2018 | Zait |
| 10,257,668 | B2 | 4/2019 | Shaw et al. |
| 10,706,704 | B1 * | 7/2020 | Shannon ................. H04W 4/02 |

(Continued)

*Primary Examiner* — Toan N Pham
(74) *Attorney, Agent, or Firm* — Banner & Witcoff, Ltd.

(57) ABSTRACT

Aspects of the disclosure relate to utilizing a high generation cellular network for identifying devices associated with unauthorized activities and notifying enterprise facilities. A computing platform may collect device information for a plurality of user devices at a first location. Then, the computing platform may receive, from a first device at the first location, a message related to a first activity in a vicinity of the first location. Then, the computing platform may identify a sub-plurality of the plurality of user devices, wherein the sub-plurality of user devices are located at the first location at a time of occurrence of the first activity. Then, the computing platform may generate an alert notification comprising information related to the first activity and device information for the sub-plurality of user devices. Subsequently, the computing platform may send the alert notification to a collection of devices at a plurality of locations.

20 Claims, 5 Drawing Sheets

(56) References Cited

U.S. PATENT DOCUMENTS

| | | |
|---|---|---|
| 2017/0118202 A1* | 4/2017 | Mathew .............. H04L 63/0846 |
| 2017/0195339 A1* | 7/2017 | Brown .................... G06F 21/34 |
| 2019/0124044 A1 | 4/2019 | Kurian |
| 2019/0129784 A1 | 5/2019 | Kurian |

* cited by examiner

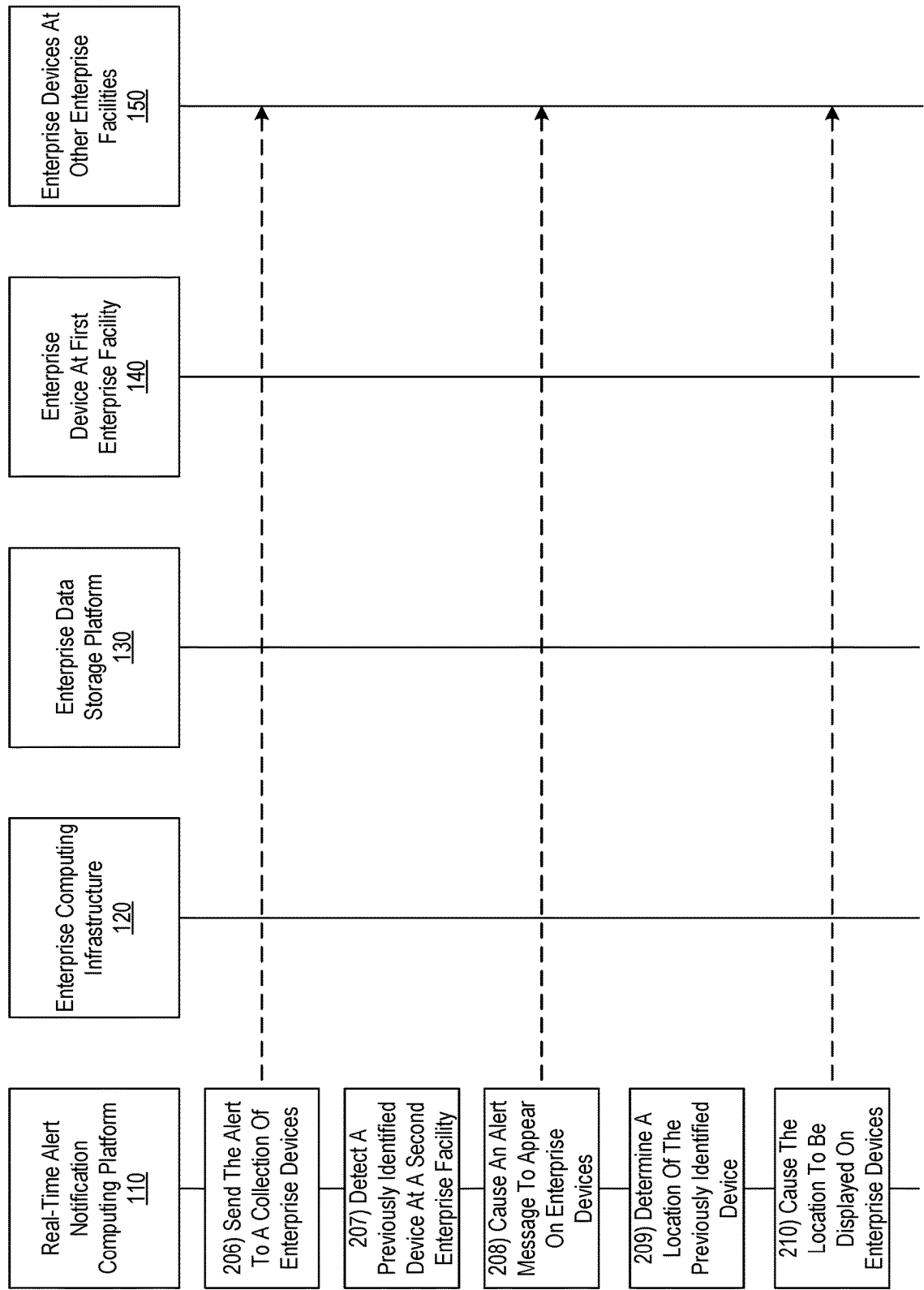

UTILIZING A HIGH GENERATION CELLULAR NETWORK FOR IDENTIFYING DEVICES ASSOCIATED WITH UNAUTHORIZED ACTIVITIES AND NOTIFYING ENTERPRISE FACILITIES

CROSS REFERENCE TO RELATED APPLICATIONS

The present application is a continuation of, and claims priority to, co-pending U.S. patent application Ser. No. 16/522,084, filed Jul. 25, 2019, and titled "Utilizing a High Generation Cellular Network for Identifying Devices Associated with Unauthorized Activities and Notifying Enterprise Facilities."

BACKGROUND

Aspects of the disclosure relate to deploying digital data processing systems and providing real-time processing of location data to identify and prevent unauthorized activities in an enterprise system. In particular, one or more aspects of the disclosure relate to utilizing a high generation cellular network for identifying devices associated with unauthorized activities and notifying enterprise facilities of such unauthorized activities.

Enterprise organizations may utilize various computing infrastructure to identify users associated with potentially unauthorized activities at their enterprise facilities, and alert other enterprise facilities that may be potentially affected by, or be targets of, potentially unauthorized activities. Such identifying and alerting may be time-sensitive and might need to be performed in real-time. In some instances, the identifying and alerting may include confidential information and/or other sensitive data that is created, transmitted, and/or used for various purposes. Ensuring that timely notifications to other potential targets of such unauthorized activities are sent in real time with speed and accuracy, may be particularly advantageous to prevention of further unauthorized activities. In many instances, however, it may be difficult to identify users associated with potentially unauthorized activities and alert other enterprise facilities with speed and accuracy while also attempting to optimize network resources, bandwidth utilization, and efficient operations of the computing infrastructure involved in providing such notifications in real time.

SUMMARY

Aspects of the disclosure provide effective, efficient, scalable, fast, reliable, and convenient technical solutions that address and overcome the technical problems associated with utilizing a high generation cellular network for identifying devices associated with unauthorized activities and notifying enterprise facilities.

In accordance with one or more embodiments, a computing platform having at least one processor, a communication interface, and memory may detect, via the communication interface, a plurality of user devices at a first enterprise facility. Then, the computing platform may collect, via the communication interface, device information for the plurality of user devices. Then, the computing platform may receive, from an enterprise device at the first enterprise facility, a message related to a first activity at the first enterprise facility. Subsequently, upon receiving the message, the computing platform may identify, based on the device information, a sub-plurality of the plurality of user devices, where the sub-plurality of user devices are located at the first enterprise facility at a time of occurrence of the first activity. Then, the computing platform may generate, based on the message, an alert notification comprising information related to the first activity and device information for the sub-plurality of user devices. Subsequently, the computing platform may send, via the communication interface, the alert notification to a collection of enterprise devices at a plurality of enterprise facilities.

In some embodiments, the computing platform may detect, via the communication interface, and at a second time after the time of the occurrence of the first activity, at least one of the sub-plurality of user devices at a second enterprise facility of the plurality of enterprise facilities. Then, the computing platform may, based on the detecting, cause an alert message to appear on a graphical user interface associated with a second enterprise device at the second enterprise facility.

In some embodiments, the computing platform may determine a location, via the communication interface and within the second enterprise facility, of the at least one of the sub-plurality of user devices. Then, the computing platform may cause the location of the at least one of the sub-plurality of user devices to be displayed via the graphical user interface associated with the second enterprise device. In some embodiments, the computing platform may, based on the detecting, generate a second alert notification related to the at least one of the sub-plurality of user devices. Subsequently, the computing platform may send, via the communication interface, the second alert notification to a second collection of enterprise devices at a second plurality of enterprise facilities. In some embodiments, the computing platform may generate, based on the device information, a unique identifier for each user device of the plurality of user devices. Subsequently, the computing platform may detect the at least one of the sub-plurality of user devices at the second enterprise facility based on a unique identifier associated with the at least one of the sub-plurality of user devices. In some embodiments, the alert message may include instructions, for steps to be performed by an enterprise user of the second enterprise device, to prevent potential unauthorized activity at the second enterprise facility.

In some embodiments, the computing platform may identify the sub-plurality of user devices based on a proximity of the sub-plurality of user devices to a location of the first activity.

In some embodiments, the computing platform may determine a threat score for a particular device of the sub-plurality of user devices, where the threat score is based at least in part on a number of times the particular device is detected at an enterprise facility at a time of occurrence of an unauthorized activity.

In some embodiments, the first enterprise facility may be a financial institution, and the first activity may be an unauthorized activity at the financial institution.

In some embodiments, the communications interface may be over a fifth generation cellular network.

In some embodiments, the computing platform may identify the plurality of enterprise facilities based on a proximity to the first enterprise facility.

In some embodiments, the computing platform may generate, based on device information, a digital forensic footprint for a particular user device of the plurality of user devices.

In some embodiments, the computing platform may identify, based on the message, a particular enterprise facility previously visited by a particular user device of the plurality of user devices. Subsequently, the computing platform may detect a previously undetected unauthorized activity at the particular enterprise facility.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A and 2B depict an illustrative event sequence for utilizing a high generation cellular network for identifying devices associated with unauthorized activities and notifying enterprise facilities in accordance with one or more example embodiments.

DETAILED DESCRIPTION

Figure 1A:
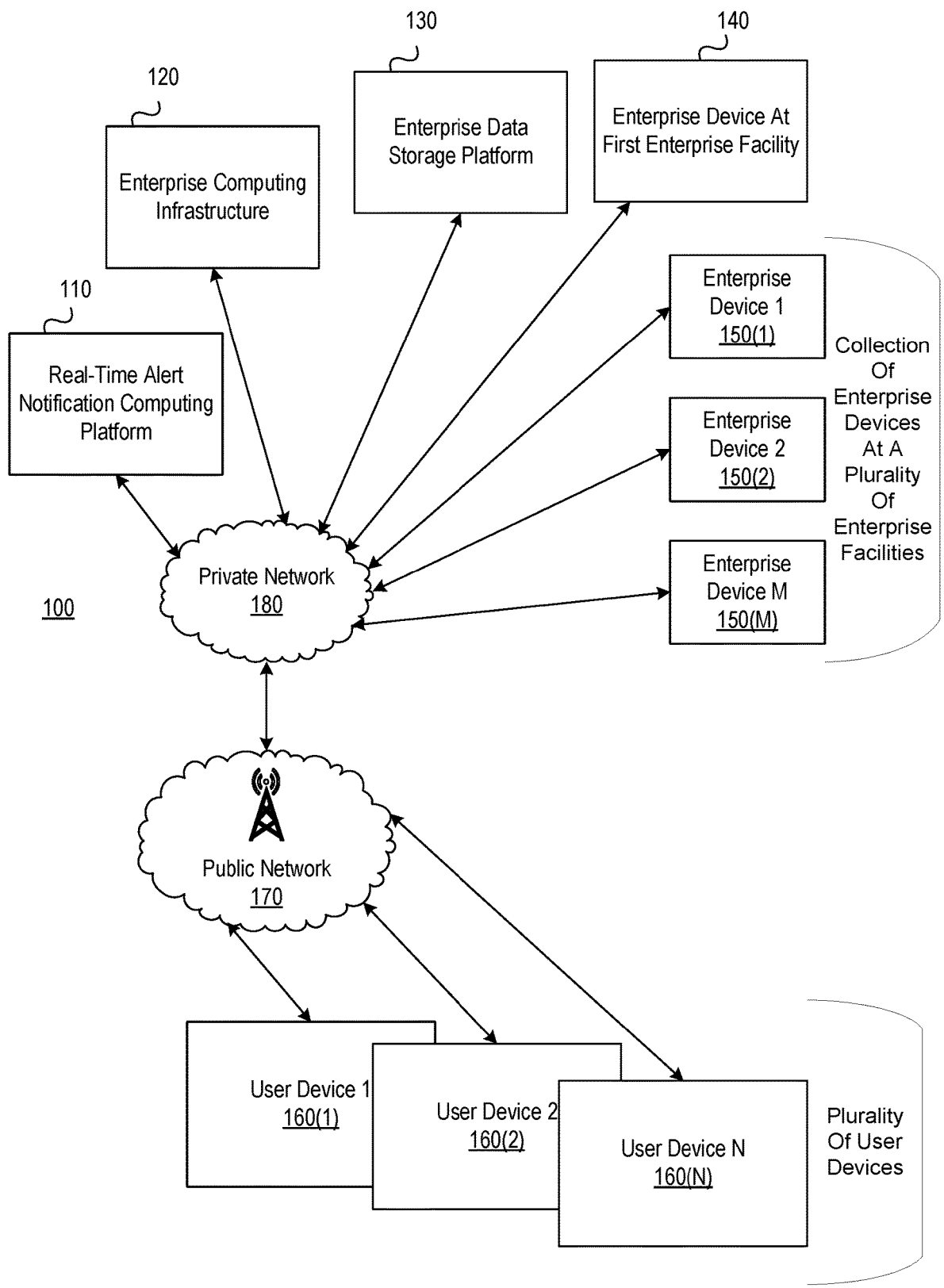
FIGS. 1A and 1B depict an illustrative computing environment for utilizing a high generation cellular network for identifying devices associated with unauthorized activities and notifying enterprise facilities in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to utilizing a high generation cellular network for identifying devices associated with unauthorized activities and notifying enterprise facilities. For example, an enterprise computing device may detect potentially unauthorized activity at an enterprise facility, analyze location data in real-time to identify a user device associated with such activity and identify additional devices proximate to the identified user device, and send real-time alert notifications to other enterprise facilities. Fast data transmission rates, accuracy of location data, and availability of multiple simultaneous communication channels may facilitate sending such time-sensitive alert notifications.

Cellular networks are generally associated with service areas that are subdivided into cells. Location data for devices are based on the cell within which the device is located. Accordingly, smaller cells provide greater accuracy and reliability of location data. High generation cellular networks, such as fifth generation ("5G") cellular networks, may be configured to considerably reduce the cell size, thereby improving accuracy of location data. Also, for example, in high generation cellular networks, each cell may be equipped with multiple antennas configured to communicate with the device within the cell so that multiple streams of data may be simultaneously transmitted, thereby increasing data transmission rates, reducing backlog due to network traffic, and enhancing speed and accuracy of communications.

In some instances, when a user computing device (e.g., a user device of a bank customer) enters an enterprise facility (e.g., a banking facility), a computing platform for the enterprise organization (e.g., a bank) may be able to detect and identify the user computing device based on location data. In some instances, if the user (e.g., a bank customer) is associated with a potentially unauthorized activity, then the user computing device associated with the user may be identified. The computing platform may be able to generate notifications in real-time. Generating and relaying such time-sensitive alert notifications may facilitate preventing and/or detecting other potentially unauthorized activity. Location accuracy may be utilized to identify relevant devices. When such unauthorized activity has to be detected, associated users have to be identified, and time-sensitive alert notifications have to be generated and sent in real-time, high-speed data transmission rates, increased bandwidth, greater location accuracy, and low latency may be particularly advantageous to prevent and/or detect other potentially unauthorized activity.

Figure 1B:
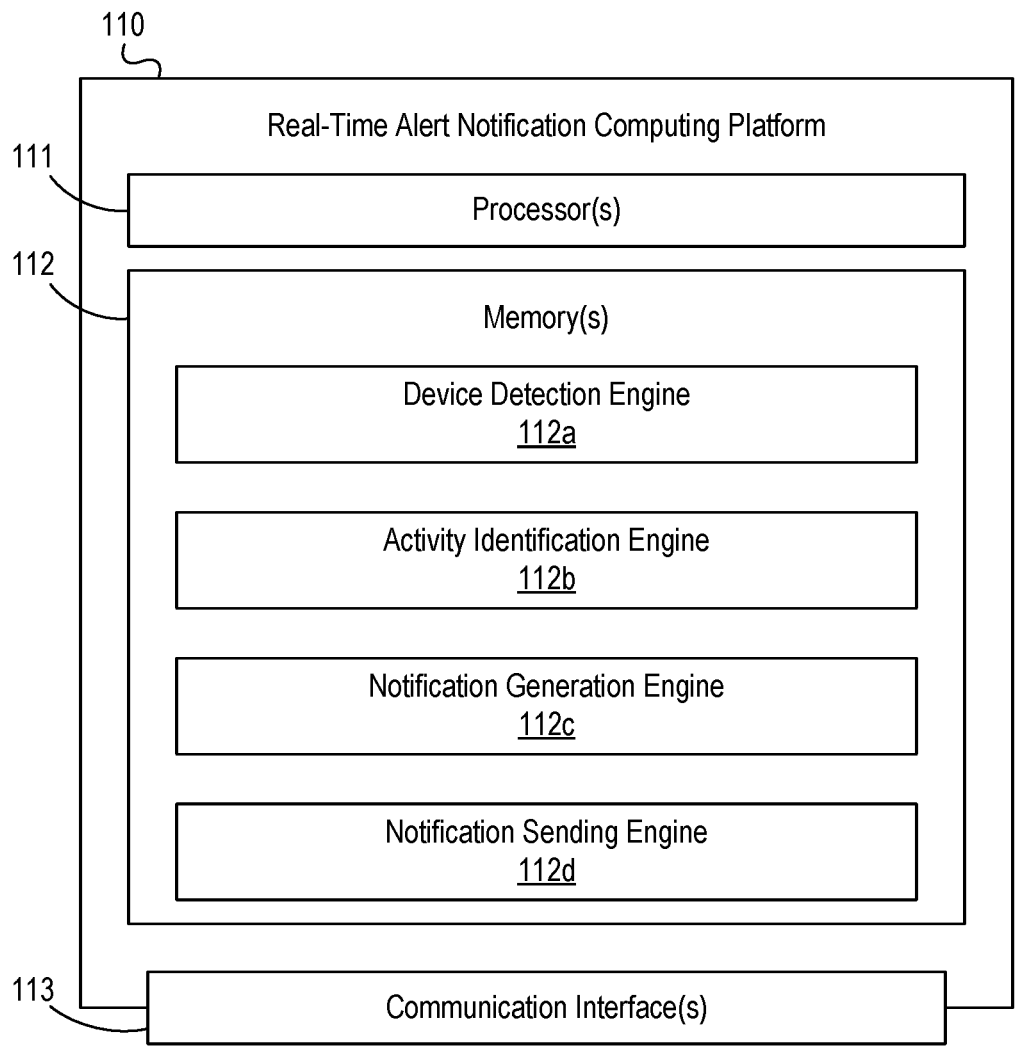

FIGS. 1A and 1B depict an illustrative computing environment for utilizing a high generation cellular network for identifying devices associated with unauthorized activities and notifying enterprise facilities in accordance with one or more example embodiments. Referring to FIG. 1A, computing environment 100 may include one or more computer systems. For example, computing environment 100 may include real-time alert notification computing platform 110, enterprise computing infrastructure 120, enterprise data storage platform 130, enterprise device 140 at first enterprise facility, enterprise devices 150(1), 150(2), . . . , 150(M) at a plurality of enterprise facilities, and a plurality of user devices 160(1), 160(2), . . . , 160(N).

As illustrated in greater detail below, real-time alert notification computing platform 110 may include one or more computing devices configured to perform one or more of the functions described herein. For example, real-time alert notification computing platform 110 may include one or more computers (e.g., laptop computers, desktop computers, servers, server blades, or the like) and/or other computer components (e.g., processors, memories, communication interfaces).

Enterprise computing infrastructure 120 may include one or more computing devices and/or other computer components (e.g., processors, memories, communication interfaces). In addition, enterprise computing infrastructure 120 may be configured to host, execute, and/or otherwise provide one or more enterprise applications. For example, enterprise computing infrastructure 120 may be configured to host, execute, and/or otherwise provide an enterprise mobile application for user devices, and/or other programs associated with an enterprise server. In some instances, enterprise computing infrastructure 120 may be configured to provide various enterprise and/or back-office computing functions for an enterprise organization, such as a financial institution. For example, enterprise computing infrastructure 120 may include various servers and/or databases that store and/or otherwise maintain account information, such as financial account information including account balances, transaction history, account owner information, and/or other information. In addition, enterprise computing infrastructure 120 may process and/or otherwise execute tasks on specific accounts based on commands and/or other information received from other computer systems included in computing environment 100. Additionally, or alternatively, enterprise computing infrastructure 120 may receive instructions from real-time alert notification computing platform 110 and execute the instructions in a timely manner.

Enterprise data storage platform 130 may include one or more computing devices and/or other computer components (e.g., processors, memories, communication interfaces). In addition, and as illustrated in greater detail below, enterprise data storage platform 130 may be configured to store and/or otherwise maintain enterprise data. Additionally, or alternatively, enterprise computing infrastructure 120 may be configured to store and/or otherwise maintain user data. For example, enterprise computing infrastructure 120 may be configured to store and/or otherwise maintain unauthorized activities associated with users, historical data related to users, location data of computing devices, and so forth. Additionally, or alternatively, enterprise computing infrastructure 120 may load data from enterprise data storage platform 130, manipulate and/or otherwise process such data, and return modified data and/or other data to enterprise data storage platform 130 and/or to other computer systems included in computing environment 100.

Enterprise device 140 and enterprise devices 150(1), 150(2), . . . , 150(M) may each be a personal computing device (e.g., desktop computer, laptop computer) or mobile computing device (e.g., smartphone, tablet). In addition, each of enterprise device 140 and enterprise devices 150(1), 150(2), . . . , 150(M) may be linked to and/or used by a specific enterprise user (who may, e.g., be an employee or other affiliate of an enterprise organization operating real-time alert notification computing platform 110). In some instances, enterprise device 140 may be located at first enterprise facility and enterprise devices 150(1), 150(2), . . . , 150(M) may be located at a plurality of enterprise facilities.

Plurality of user devices 160(1), 160(2), . . . , 160(N) may each be a personal computing device (e.g., desktop computer, laptop computer) or mobile computing device (e.g., smartphone, tablet, wearable device). In addition, each of plurality of user devices 160(1), 160(2), . . . , 160(N) may be linked to and/or used by a specific user (who may, e.g., be a customer of a financial institution or other organization operating real-time alert notification computing platform 110). Also, for example, users associated with plurality of user devices 160(1), 160(2), . . . , 160(N) may use plurality of user devices 160(1), 160(2), . . . , 160(N) to perform financial transactions, and/or banking functions.

Computing environment 100 also may include one or more networks, which may interconnect one or more of real-time alert notification computing platform 110, enterprise computing infrastructure 120, enterprise data storage platform 130, enterprise device 140 at first enterprise facility, a collection of enterprise devices 150(1), 150(2), . . . , 150(M) at a plurality of enterprise facilities, and plurality of user devices 160(1), 160(2), . . . , 160(N). For example, computing environment 100 may include private network 180 (which may interconnect, for example, real-time alert notification computing platform 110, enterprise computing infrastructure 120, enterprise data storage platform 130, enterprise device 140 at first enterprise facility, enterprise devices 150(1), 150(2), . . . , 150(M) at a plurality of enterprise facilities, and/or one or more other systems which may be associated with an organization, such as a financial institution) and public network 170 (which may, e.g., interconnect plurality of user devices 160(1), 160(2), . . . , 160(N) with private network 180 and/or one or more other systems, public networks, sub-networks, and/or the like). Public network 170 may be a high generation cellular network, such as, for example, a 5G cellular network. In some embodiments, private network 180 may likewise be a high generation cellular enterprise network, such as, for example, a 5G cellular network. As described herein, in some embodiments, the communication interface may be over a high generation cellular network, such as, for example, a fifth generation cellular network.

In one or more arrangements, enterprise computing infrastructure 120, enterprise data storage platform 130, and enterprise device 140, and/or the other systems included in computing environment 100 may be any type of computing device capable of communicating with a user interface, receiving input via the user interface, and communicating the received input to one or more other computing devices. For example, enterprise computing infrastructure 120, enterprise data storage platform 130, enterprise device 140 at first enterprise facility, collection of enterprise devices 150(1), 150(2), . . . , 150(M) at a plurality of enterprise facilities, and plurality of user devices 160(1), 160(2), . . . , 160(N), and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of real-time alert notification computing platform 110, enterprise computing infrastructure 120, enterprise data storage platform 130, enterprise device 140 at first enterprise facility, collection of enterprise devices 150(1), 150(2), . . . , 150(M) at a plurality of enterprise facilities, and plurality of user devices 160(1), 160(2), . . . , 160(N), may, in some instances, be special-purpose computing devices configured to perform specific functions.

Referring to FIG. 1B, real-time alert notification computing platform 110 may include one or more processors 111, memory 112, and communication interface 113. A data bus may interconnect processor 111, memory 112, and communication interface 113. Communication interface 113 may be a network interface configured to support communication between real-time alert notification computing platform 110 and one or more networks (e.g., public network, private network, a local network, or the like). Memory 112 may include one or more program modules having instructions that when executed by processor 111 cause real-time alert notification computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of real-time alert notification computing platform 110 and/or by different computing devices that may form and/or otherwise make up real-time alert notification computing platform 110. For example, memory 112 may have, store, and/or include device detection engine 112a, activity identification engine 112b, notification generation engine 112c, and notification sending engine 112d. Device detection engine 112a may have instructions that direct and/or cause real-time alert notification computing platform 110 to detect, via the communication interface, a plurality of user devices at a first enterprise facility associated with enterprise computing infrastructure 120, as discussed in greater detail below. Also, for example, device detection engine 112a may have instructions that direct and/or cause real-time alert notification computing platform 110 to collect, via the communication interface, device information for the plurality of user devices. Activity identification engine 112*b* may have instructions that direct and/or cause real-time alert notification computing platform 110 to, receive, from an enterprise device at the first enterprise facility, a message related to a first activity at the first enterprise facility. Device detection engine 112*a* may have instructions that direct and/or cause real-time alert notification computing platform 110 to, upon receiving the message, identify, by the computing platform and based on the device information, a sub-plurality of the plurality of user devices, where the sub-plurality of user devices is located at the first enterprise facility at a time of occurrence of the first activity. Notification generation engine 112*c* may have instructions to generate, based on the message, an alert notification comprising information related to the first activity and device information for the sub-plurality of user devices. Notification sending engine 112*d* may have instructions to send, via the communication interface, the alert notification to a collection of enterprise devices at a plurality of enterprise facilities.

Figure 2A:
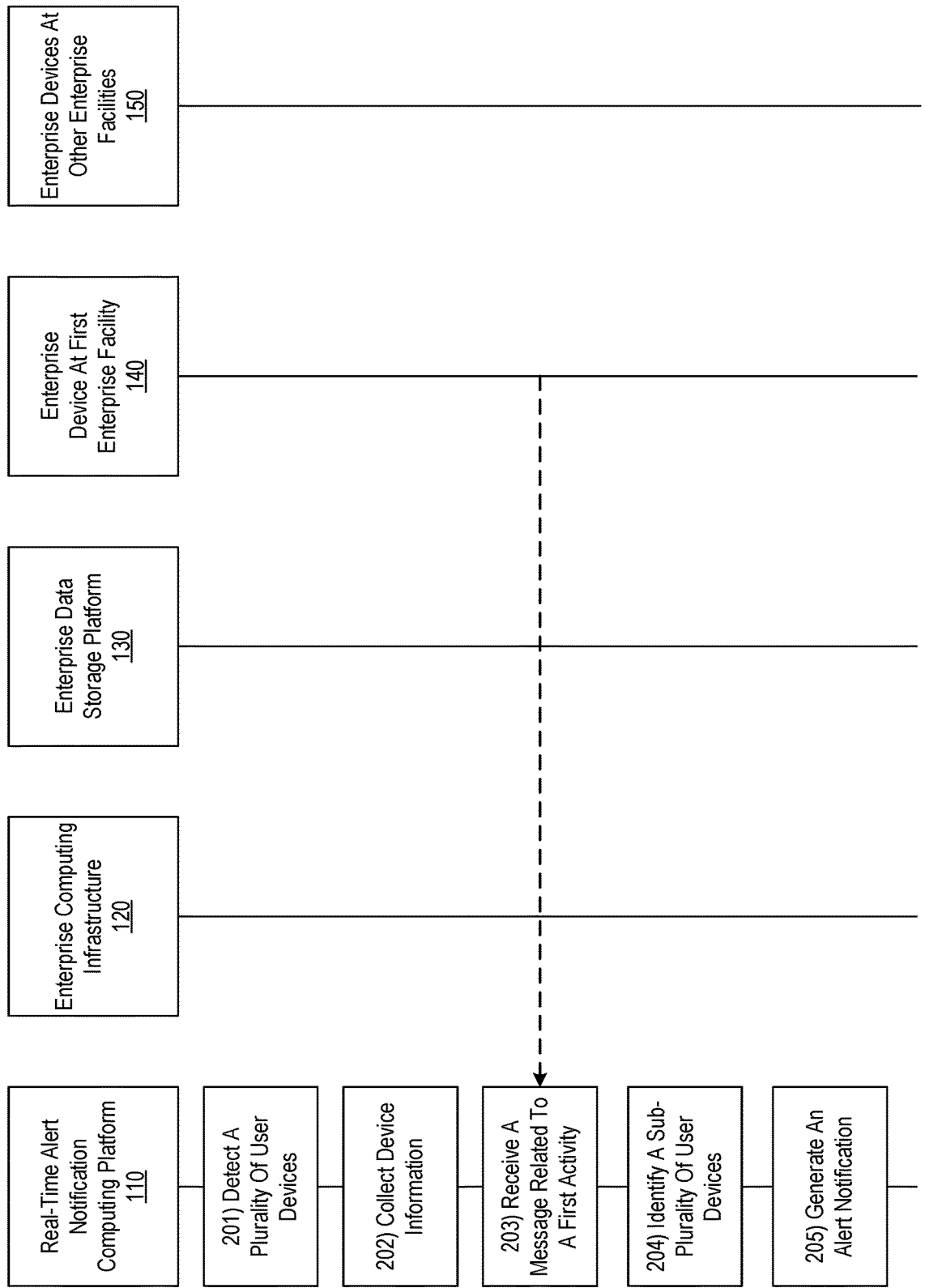

FIGS. 2A and 2B depict an illustrative event sequence for utilizing a high generation cellular network for identifying devices associated with unauthorized activities and notifying enterprise facilities in accordance with one or more example embodiments. Referring to FIG. 2A, at step 201, real-time alert notification computing platform 110 may detect, via the communication interface, a plurality of user devices at a first enterprise facility. For example, as a plurality of user devices (e.g., user devices 160(1), 160(2), . . . , 160(N)) enter an enterprise facility, real-time alert notification computing platform 110 may detect communication signals from the plurality of user devices (e.g., user devices 160(1), 160(2), . . . , 160(N)). For example, the plurality of user devices (e.g., user devices 160(1), 160(2), . . . , 160(N)) may attempt to discover, and/or connect to, a network at the enterprise facility via a 5G network, a Bluetooth network, and/or Wireless Fidelity ("Wi-Fi") network. Accordingly, the plurality of user devices (e.g., user devices 160(1), 160(2), . . . , 160(N)) may transmit communication signals (e.g., a beacon) to connect to the 5G, Bluetooth, and/or Wi-Fi network, and real-time alert notification computing platform 110 may detect such communication signals.

At step 202, real-time alert notification computing platform 110 may collect, via the communication interface, device information for the plurality of user devices. For example, as the plurality of user devices (e.g., user devices 160(1), 160(2), . . . , 160(N)) transmit the communication signals, such transmissions may include device information, such as, for example, a make and model of a user device. In some instances, device information may include a network address (e.g., a Wi-Fi address) associated with a user device. Accordingly, real-time alert notification computing platform 110 may collect such device information over the communication interface.

Device information may also be collected from a variety of sources, such as, for example, a satellite-based navigation system such as a global positioning system ("GPS"), known locations of cellular towers (e.g., in a 5G network), and Wi-Fi networks. In some embodiments, at step 202, real-time alert notification computing platform 110 may utilize a high generation cellular network (e.g., public network 170) to collect device information for one or more user devices. Higher bandwidth and low latency features of such high generation cellular networks may enhance an ability to collect such device information.

In some embodiments, real-time alert notification computing platform 110 may store the collected device information in an enterprise data storage platform (e.g., enterprise data storage platform 130). In some embodiments, real-time alert notification computing platform 110 may generate, based on the collected device information, a unique identifier for one or more of the plurality of user devices (e.g., user devices 160(1), 160(2), . . . , 160(N)). For example, in some instances, when real-time alert notification computing platform 110 collects device information for a user device for the first time, real-time alert notification computing platform 110 may generate a unique anonymized identifier for such user device, and store an association of the unique anonymized identifier with the user device in the enterprise data storage platform (e.g., enterprise data storage platform 130). When the user device is detected during successive visits to an enterprise facility, real-time alert notification computing platform 110 may recognize the user device based on the associated unique identifier.

At step 203, real-time alert notification computing platform 110 may receive, from an enterprise device (e.g., enterprise device 140) at a first enterprise facility, a message related to a first activity at the first enterprise facility. For example, at step 203, real-time alert notification computing platform 110 may detect a first activity such as a potentially unauthorized activity taking place at an enterprise facility. For example, operator of an enterprise device (e.g., enterprise device 140) at the first enterprise facility may determine that a potentially unauthorized activity may be taking place. For example, the first enterprise facility may be a financial institution (e.g., a banking facility) and the operator of enterprise device 140 may be an employee (e.g., bank teller). A banking customer may be transacting business with the bank teller. In the course of such a transaction, the bank teller may receive currency notes that appear to be stolen or unauthorized reproductions. In some instances, the bank teller may be able to perform a spot-test to determine if a currency note is an unauthorized reproduction. Also, for example, the bank teller may be able to recognize stolen currency notes based on serial numbers associated with currency notes. As another example, the bank teller may receive a check and/or other financial instrument that may not appear to be genuine. Also, for example, the bank teller may receive a payment request based on a credit card that has been reported lost and/or stolen. As another example, the bank teller may have reason to believe that an individual associated with the first activity is committing an unauthorized financial activity, an embezzlement, and/or is impersonating another individual.

In some embodiments, based on a determination that a potentially unauthorized activity may be taking place at the first enterprise facility, the operator of the enterprise device (e.g., enterprise device 140) may send a message to real-time alert notification computing platform 110. For example, the operator of the enterprise device (e.g., enterprise device 140) may access an alert notification icon via a user interface on the enterprise device (e.g., enterprise device 140). Upon selecting the notification icon, a notification application may be opened and the operator of the enterprise device (e.g., enterprise device 140) may be prompted to enter information relevant to the first activity. For example, the operator may be provided with a text box to enter a short description of the first activity. For, example, the operator may enter "high dollar deposit of unauthorized reproduction of currency" into such a text box. Also, for example, the operator may be provided with a drop-down menu to indicate a type of the first activity (e.g., unauthorized activity involving financial instruments, embezzlement, impersonation, stolen and/or lost card, unauthorized reproductions of currency, and the like). In some embodiments, the operator may be prompted to provide a personal identification number and/or other information that may be utilized later to further investigate the first activity. In some embodiments, the operator may be prompted to provide additional information, such as related to, an amount of currency, a breakdown of denominations, a type of currency (e.g., U.S. Dollar, Euro, and so forth), relevant credit card information (e.g., details of a lost and/or stolen card, a scanned image of a card), customer information for a potentially compromised account (e.g., name, type of account, account number), an image of an unauthorized signature, and the like. In some embodiments, the notification application may automatically detect a time and a location for the first activity. Upon an affirmative confirmation from the operator (e.g., clicking "OK" on a confirmation pop-up application), the enterprise device (e.g., enterprise device 140) may send a message to real-time alert notification computing platform 110. In some embodiments, the message may include details of the first activity, such as the additional information entered by the operator, the time, and/or place, and so forth.

At step 204, upon receiving the message, real-time alert notification computing platform 110 may identify, based on the device information, a sub-plurality of the plurality of user devices, where the sub-plurality of user devices are located at the first enterprise facility at a time of occurrence of the first activity. For example, real-time alert notification computing platform 110 may bundle device information for the sub-plurality of user devices based on their presence at the first enterprise facility at the time of occurrence of the first activity. In some instances, the sub-plurality of user devices may be the plurality of user devices (e.g., user devices 160(1), 160(2), . . . , 160(N)). In some embodiments, the sub-plurality of user devices may be user devices that are detected by real-time alert notification computing platform 110 to be at the first enterprise facility within a time threshold of the time of occurrence of the first activity. For example, the time of occurrence of the first activity may be 2:05 PM, and real-time alert notification computing platform 110 may include, in the sub-plurality of user devices, user devices detected at the first enterprise facility between 1:30 P.M. and 2:30 P.M. Higher speeds and enhanced reliability of higher generation cellular networks may enable receiving and sending messages, notifications, and so forth in real time.

In some embodiments, real-time alert notification computing platform 110 may identify the sub-plurality of user devices based on a proximity of the sub-plurality of user devices to a location of the first activity. Enterprise facilities may, in some instance, be very large, and comprise several different departments. For example, an enterprise facility may include a mortgage center, a financial advisory center, a cash deposit and withdrawal center, and so forth. Although real-time alert notification computing platform 110 may detect a plurality of user devices (e.g., user devices 160(1), 160(2), . . . , 160(N)) at the first enterprise facility, the first activity may take place at, for example, the cash deposit and withdrawal center. Accordingly, real-time alert notification computing platform 110 may identify the sub-plurality of user devices based on a proximity of the sub-plurality of user devices to the cash deposit and withdrawal center. Accordingly, user devices located at other locations of the first enterprise facility, such as, for example, the mortgage center, the financial advisory center, and so forth, may not be included among the sub-plurality of user devices. Precision of location data from high generation cellular networks enables accurate and reliable identification of such user devices in real time.

For example, real-time alert notification computing platform 110 may analyze the message to determine a location of the teller, and identify a user associated with a user device at that location. Location data may be retrieved from a variety of sources, such as, for example, an image capture device at an enterprise facility, from a satellite-based navigation system such as a global positioning system ("GPS"), known locations of cellular towers, and Wi-Fi networks. In some embodiments, real-time alert notification computing platform 110 may utilize a high generation cellular network (e.g., public network 170) to retrieve location data for one or more devices, and determine proximity based on such location data. Accuracy of location data of devices over a higher generation cellular network (e.g., a 5G network) may allow for precise identifications of devices, thereby including devices that may be associated with unauthorized activity, while not including devices that might not be associated with unauthorized activity, and thereby enhancing the overall efficiency of real-time alert notification computing platform 110.

In some embodiments, real-time alert notification computing platform 110 may access images from one or more image capture devices (e.g., closed circuit cameras) at the first enterprise facility to identify a user associated with the first activity, and utilize highly precise location data to identify an associated user device. For example, the message may indicate a location of a teller within the banking facility, and real-time alert notification computing platform 110 may identify a user transacting business with the teller, and a user device associated with such user. As another example, highly precise location data (e.g., location data from a fifth generation cellular network) may indicate recent movement of a device from the relevant bank teller, and real-time alert notification computing platform 110 may thus identify a user device associated with the first activity.

Also, for example, based on location data received via the communications interface, real-time alert notification computing platform 110 may identify a sub-plurality of the plurality of user devices (e.g., user devices 160(1), 160(2), . . . , 160(N)) located at the first enterprise facility. For example, the received message may indicate a time of occurrence of the first activity. Real-time alert notification computing platform 110 may analyze the location data to determine distances of devices from a location of the first activity to identify that a sub-plurality of user devices located at the first enterprise facility are proximate to the location of the first activity at the time of occurrence of the first activity. Also, for example, real-time alert notification computing platform 110 may apply distance measurement techniques to determine distances between devices (e.g., triangulation techniques to locate nodes within a network), and identify that a sub-plurality of user devices located at the first enterprise facility are proximate to the location of the first activity.

In some embodiments, real-time alert notification computing platform 110 may update a device movement pattern corresponding to one or more user devices, and store such pattern in an enterprise data storage platform (e.g., enterprise data storage platform 130). For instance, real-time alert notification computing platform 110 may update, based on location data, a movement pattern corresponding to a user device to indicate movement of the user device within an operating environment. For example, real-time alert notification computing platform 110 may monitor progress of a user device within a queue while a user associated with the user device waits for services to be rendered. For example, real-time alert notification computing platform 110 may detect when the user device leaves the queue and proceeds to a point of sales location.

Also, for example, real-time alert notification computing platform 110 may update, based on location data, a movement pattern corresponding to the plurality of user devices (e.g., user devices 160(1), 160(2), . . . , 160(N)) to indicate movement of the plurality of user devices (e.g., user devices 160(1), 160(2), . . . , 160(N)) within an operating environment. For instance, real-time alert notification computing platform 110 may detect the arrival of one or more of the plurality of user devices (e.g., user devices 160(1), 160(2), . . . , 160(N)) within an operating environment, and may detect that one or more of the plurality of user devices (e.g., user devices 160(1), 160(2), . . . , 160(N)) has joined the same queue as another user device. As devices move through the computing environment, the movement patterns may, for instance, map where the devices have been and where they are going within an operating environment; in addition, real-time alert notification computing platform 110 may record the device movement patterns, and store the patterns in the enterprise data storage platform (e.g., enterprise data storage platform 130). Thus, real-time alert notification computing platform 110 may map the movement of devices, as well as relative distances between user devices as they move through the computing environment, which may enable real-time alert notification computing platform 110 to identify user devices associated with unauthorized activities within an operating environment.

At step 205, real-time alert notification computing platform 110 may generate an alert notification including information related to the first activity and device information for the sub-plurality of user devices. For example, real-time alert notification computing platform 110 may generate an alert notification that includes details of the first activity in the message received, such as the additional information entered by the operator, the time, and/or place, and so forth. Also, for example, the alert notification may include device information for the sub-plurality of user devices. For example, each device may be associated with a unique identifier (e.g., an encrypted identifier, an anonymized identifier, and so forth), and the alert notification may include such identifiers. In some instances, the alert notification may include identification data for users of the sub-plurality of user devices. Such identification data may be retrieved from image capture devices, local network access points, bank applications running on such user devices, and so forth.

Referring to FIG. 2B, at step 206, real-time alert notification computing platform 110 may send, via the communication interface, the alert notification to a collection of enterprise devices at a plurality of enterprise facilities. For example, real-time alert notification computing platform 110 may alert nearby enterprise facilities to a potential for unauthorized activity by users of the sub-plurality of user devices. For example, a user associated with a user device of the sub-plurality of user devices may have undertaken an unauthorized activity (e.g., presented a check with a potentially unauthorized signature to a teller at the first enterprise facility (e.g., a bank)). The teller may have identified the unauthorized activity, and subsequent to such identification, the user may have left the premises of the first enterprise facility. Real-time alert notification computing platform 110 may send an alert notification to enterprise facilities that may be potential targets of such unauthorized activity by the user. The ability to provide such alert notifications in real-time may facilitate detection and/or prevention of further unauthorized activities.

In some embodiments, the plurality of enterprise facilities may be within a geographic area. For example, real-time alert notification computing platform 110 may determine a geographic area based on a location of the first enterprise facility. In some instances, the geographic area may be a predetermined geographic area. For example, real-time alert notification computing platform 110 may group enterprise facilities based on one or more characteristics, and real-time alert notification computing platform 110 may associate each group with a predetermined geographic area.

In some embodiments, real-time alert notification computing platform 110 may identify the plurality of enterprise facilities based on a proximity to the first enterprise facility. For example, real-time alert notification computing platform 110 may identify a location of the first enterprise facility and the plurality of enterprise facilities may be determined to be enterprise facilities in an area with a similar postal code as the first enterprise facility. In some embodiments, the plurality of enterprise facilities may be within a certain radius of the first enterprise facility. For example, real-time alert notification computing platform 110 may identify the location of the first enterprise facility and the plurality of enterprise facilities may be determined to be enterprise facilities within, say, five miles of the first enterprise facility. Also, for example, real-time alert notification computing platform 110 may identify the location of the first enterprise facility and the plurality of enterprise facilities may be determined to be enterprise facilities in the county in which the first enterprise facility is located, and/or enterprise facilities in adjoining counties. In some embodiments, the notification application on an enterprise device (e.g., enterprise device 140) at an enterprise facility may be pre-configured with a list of enterprise facilities to which the alert notification is to be sent. For example, if enterprise facility A is located in the United States within a postal code "XXXXX," and there are five other enterprise facilities within the geographic area represented by the postal code, then the notification application on enterprise devices at enterprise facility A may be pre-configured to send the alert notification to the five other enterprise facilities within the geographic area represented by the postal code "XXXXX."

In some embodiments, real-time alert notification computing platform 110 may identify the plurality of enterprise facilities based on expected user traffic. For example, the first enterprise facility may be located in an area where an event is scheduled to occur. For example, the event could be a musical performance, a sporting event, a political rally, a high tourism period, a special visit by a famous personality, and so forth. Based on historical data, real-time alert notification computing platform 110 may determine that higher than average user activity is expected during one or more such events. Accordingly, there may be a need to notify enterprise facilities in a vicinity of such events, as there may be a higher propensity for unauthorized activity to occur at these enterprise facilities. Accordingly, real-time alert notification computing platform 110 may identify the plurality of enterprise facilities based on expected user traffic at such enterprise facilities.

In some embodiments, real-time alert notification computing platform 110 may identify the plurality of enterprise facilities based on a distribution of the devices. For example, real-time alert notification computing platform 110 may determine a distribution of devices based on analysis of the location data. As described herein, real-time alert notification computing platform 110 may map location data for a plurality of devices. For each enterprise facility, real-time alert notification computing platform 110 may analyze the location data to determine a distribution of devices. In some instances, a higher distribution of devices at an enterprise facility may be indicative of a high volume of business, thereby increasing a probability of occurrence of unauthorized activity at that enterprise facility. Accordingly, real-time alert notification computing platform 110 may identify enterprise facilities with a higher distribution of devices and send the alert notifications to such identified enterprise facilities.

In some embodiments, real-time alert notification computing platform 110 may identify the plurality of enterprise facilities based on a type of the first activity. For example, the first activity may be cashing a check with an unauthorized signature, and the real-time alert notification computing platform 110 may send alert notifications to enterprise facilities that provide a check cashing service to its customers. Also, for example, the first activity may be a currency exchange of a large sum of cash from a foreign currency to a domestic currency, and the real-time alert notification computing platform 110 may send alert notifications to enterprise facilities that provide the currency exchange service. As another example, the first activity may be an armed burglary, and the real-time alert notification computing platform 110 may send alert notifications to enterprise facilities that are known to have large amounts of cash available on premise.

At step 207, real-time alert notification computing platform 110 may detect, via the communication interface, and at a second time after the time of the occurrence of the first activity, at least one of the sub-plurality of user devices at a second enterprise facility of the plurality of enterprise facilities. For example, a user associated with the at least one of the sub-plurality of user devices may have presented unauthorized reproductions of currency at the first enterprise facility and, having been detected at the first enterprise facility, may proceed to a second enterprise facility to present the unauthorized reproductions of currency. Based on the alert notification, the second enterprise facility may be aware of the first activity at the first enterprise facility and an identity of the at least one of the sub-plurality of user devices. Accordingly, when the at least one of the sub-plurality of user devices enters the second enterprise facility, real-time alert notification computing platform 110 may detect the at least one of the sub-plurality of user devices. In some embodiments, real-time alert notification computing platform 110 may detect the at least one of the sub-plurality of user devices based on a unique identifier associated with the at least one of the sub-plurality of user devices. As described herein, each of the plurality of user devices at an enterprise facility may be associated with a unique identifier (e.g., an encrypted identifier, an anonymized identifier, and so forth). As a previously detected user device enters an enterprise facility, real-time alert notification computing platform 110 may detect the device based on its associated unique identifier.

As described herein, notification of unauthorized activity that took place or attempted to take place at the first enterprise facility may be provided to other relevant enterprise facilities. Generally, enterprise devices at each enterprise facility may be equipped with a "blast radius" button, and upon detection of an unauthorized activity, an enterprise user may click on the "blast radius" button, including, for example, a message that "five bad checks and suspicious money was detected, and these are the mobile devices that were within the first enterprise facility at the time such activity took place." Accordingly, based on functionality of higher generation cellular networks, real-time alert notifications may be provided to nearby enterprise facilities of potential unauthorized activities, and if one of these mobile devices crosses a threshold at one of the nearby enterprise facilities, then there is an awareness from the "blast radius" notification of potential unauthorized activities.

At step 208, real-time alert notification computing platform 110 may, based on the detecting, cause an alert message to appear on a graphical user interface associated with a second enterprise device at the second enterprise facility. In some instances, as the at least one of the sub-plurality of user devices enters the second enterprise facility, real-time alert notification computing platform 110 may cause an alert message to appear via graphical user interfaces associated with enterprise devices of the collection of enterprise devices (e.g., enterprise devices 150(1), 150(2), . . . , 150(M)) at the second enterprise facility. Accordingly, users of such enterprise devices are alerted of potential unauthorized activity in real time. For example, a bank teller at the first enterprise facility may have been diligent in using a spot-test to detect unauthorized reproductions of currency. In case a teller did not notice the suspicious financial activity, causing the alert message to appear via graphical user interfaces associated with enterprise devices may alert the bank tellers, and remind them to perform relevant security steps.

In some embodiments, the alert message may include instructions, for steps to be performed by an enterprise user of the second enterprise device, to prevent potential unauthorized activity at the second enterprise facility. For example, if the first activity relates to a deposit or an attempted deposit of unauthorized reproductions of currency at the first enterprise facility, the alert message may remind the enterprise user at the second enterprise facility to perform the spot-checks to detect unauthorized reproductions of currency. Also, for example, if the first activity related to a burglary, then the alert message may be sent to the security personnel with a reminder to trigger a security protocol (e.g., lock down a particular section of the second enterprise facility, alert law enforcement personnel to the possibility of an attempted burglary, immediately vacate a section of the enterprise facility to prevent injuries to enterprise customers, cause surveillance cameras to capture images of particular areas of the enterprise facility, cause surveillance cameras to monitor movements of one or more individuals associated with unauthorized activities, and so forth) at the second enterprise facility, and the security personnel may trigger such security protocol upon receipt of the alert message.

Alert messages may be provided to targeted groups of professionals and/or employees. For example, real-time alert notification computing platform 110 may cause alert messages to be provided to field leadership at enterprise facilities, the security team, law enforcement personnel, medical personnel, emergency personnel, and so forth. Also, for example, the alert messages may be provided via different enterprise devices (e.g., a mobile device, a wearable device, and so forth). In some instances, a large enterprise facility (e.g., financial centers) may cover 20,000-30,000 square feet in area, and enterprise users (e.g., associates, bank personnel) may be located at different parts of the enterprise facility. Accordingly, the alert message may provide a fast and reliable means to reach enterprise users in real time, and warn them about potential and/or ongoing unauthorized activity.

At step 209, real-time alert notification computing platform 110 may determine a location, via the communication interface and within the second enterprise facility, of the at least one of the sub-plurality of user devices. For example, based on precise location data, real-time alert notification computing platform 110 may determine a movement pattern of the at least one of the sub-plurality of user devices within the second enterprise facility. Also, for example, real-time alert notification computing platform 110 may capture an image and/or video (e.g., via a network of image capturing devices) of the at least one of the sub-plurality of user devices within the second enterprise facility. In some instances, real-time alert notification computing platform 110 may determine that the at least one of the sub-plurality of user devices is proceeding, for example, to a mortgage center, or a particular teller, or a loan program officer.

At step 209, real-time alert notification computing platform 110 may cause the location of the at least one of the sub-plurality of user devices to be displayed via the graphical user interface associated with the second enterprise device. For example, real-time alert notification computing platform 110 may cause such location and/or movement pattern to be displayed on a map of the second enterprise facility, and cause the map to be displayed via the graphical user interface associated with enterprise devices of security personnel. Also, for example, real-time alert notification computing platform 110 may cause a video to be displayed via the graphical user interface associated with enterprise devices of security personnel. As another example, real-time alert notification computing platform 110 may determine that the at least one of the sub-plurality of user devices is proceeding, for example, to the mortgage center, and real-time alert notification computing platform 110 may cause the location of the at least one of the sub-plurality of user devices to be displayed via the graphical user interfaces associated with enterprise devices at the mortgage center. In some instances, the location of the at least one of the sub-plurality of user devices may be included in the alert message. In some instances, the location of the at least one of the sub-plurality of user devices may be a dynamic, real-time information provided continuously, and/or provided via a series of alert message updates.

In some embodiments, real-time alert notification computing platform 110 may, based on the detecting, generate a second alert notification related to the at least one of the sub-plurality of user devices. For example, real-time alert notification computing platform 110 may generate the second alert notification in a manner similar to the generation of the prior alert notification. For example, the second alert notification may include device information and/or for the at least one of the sub-plurality of user devices, and/or identification data for a user with associated the at least one of the sub-plurality of user devices.

In some embodiments, real-time alert notification computing platform 110 may send the second alert notification to a second collection of enterprise devices at a second plurality of enterprise facilities. For example, real-time alert notification computing platform 110 may identify a second plurality of enterprise facilities in a manner similar to identifying the plurality of enterprise facilities, and send the second alert notification to one or more enterprise devices at the second plurality of enterprise facilities. For example, after a first activity is identified at the first enterprise facility, and a subsequent activity (e.g., presence of the at least one of the sub-plurality of user devices at a second enterprise facility) is identified, real-time alert notification computing platform 110 may send the second alert notification to alert other enterprise facilities of such unauthorized activities.

In some embodiments, real-time alert notification computing platform 110 may determine a threat score for a particular device of the sub-plurality of user devices, where the threat score is based at least in part on a number of times the particular device is detected at an enterprise facility at a time of occurrence of an unauthorized activity. For example, each time a user device is associated with unusual and/or unauthorized activity, real-time alert notification computing platform 110 may update a count for the user device, such as, for example, a numerical value stored as a counter in an enterprise data storage platform (e.g., enterprise data storage platform 130). In some embodiments, the threat score may be based on a type of activity. For example, a user device associated with repeated armed burglaries may have a higher threat score than a user device associated with repeated unauthorized activity involving a financial instrument. As another example, a user device associated with repeated transactions involving unauthorized reproductions of currency of a high value may have a higher threat score than a user device associated with repeated transactions involving unauthorized reproductions of currency of a lower value. In some embodiments, real-time alert notification computing platform 110 may store the threat score in the enterprise data storage platform (e.g., enterprise data storage platform 130).

In some embodiments, real-time alert notification computing platform 110 may associate alert notifications with threat levels based on the threat score. For example, if a user device associated with a higher threat score is detected at an enterprise facility, then the threat level for the alert notification may be elevated. Also, for example, real-time alert notification computing platform 110 may associate a frequency of alert notifications with the threat score.

In some embodiments, real-time alert notification computing platform 110 may generate, based on device information, a digital forensic footprint for a particular user device of the plurality of user devices. For example, each time a user device is associated with unusual and/or unauthorized activity, real-time alert notification computing platform 110 may update the device information stored in the enterprise data storage platform (e.g., enterprise data storage platform 130). For example, real-time alert notification computing platform 110 may maintain a record of a time, type of activity, location of an enterprise facility where the activity occurred, and so forth. Accordingly, historical data for the device may be maintained and updated to generate the digital forensic footprint. In some instances, such a digital forensic footprint may be provided to law enforcement personnel.

In some embodiments, real-time alert notification computing platform 110 may identify, based on the message, a particular enterprise facility previously visited by a particular device of the plurality of user devices. For example, upon receiving the message related to the first activity at the first enterprise facility, real-time alert notification computing platform 110 may retrieve historical device information (e.g., a digital forensic footprint) from the enterprise data storage platform (e.g., enterprise data storage platform 130). Based on such historical data, real-time alert notification computing platform 110 may identify a particular enterprise facility previously visited by a particular user device of the plurality of user devices. Accordingly, real-time alert notification computing platform 110 may send an alert notification to the particular enterprise facility. For example, real-time alert notification computing platform 110 may send device information, a time of the previous visit, and details of the first activity to the particular enterprise facility. Accordingly, personnel at the previously visited enterprise facility may review transactions that took place and identify a previously undetected unauthorized activity.

For example, user device A may be associated with a transaction involving an unauthorized reproduction of currency at enterprise facility A. User device A may have visited enterprise facility B prior to visiting enterprise facility A, and may have successfully completed a transaction involving an unauthorized reproduction of currency at enterprise facility B. Based on a detection of the transaction at enterprise facility A, real-time alert notification computing platform 110 may alert enterprise facility B. Accordingly, personnel at enterprise facility B may be able to detect the prior successful unauthorized activity.

The techniques described herein may be based on near-real time identification of events and devices associated with unauthorized activities, generation and sending of alerts and exchange of data and communications between devices over multiple communication channels. Such activities may be enabled by at least the high bandwidth, low latency, high data transmission rates, and/or location accuracies associated with evolving high generation cellular networks (e.g., public network 170), that may optionally be configured for seamless communications with local networks, and/or private networks (e.g., private network 180).

Figure 3:
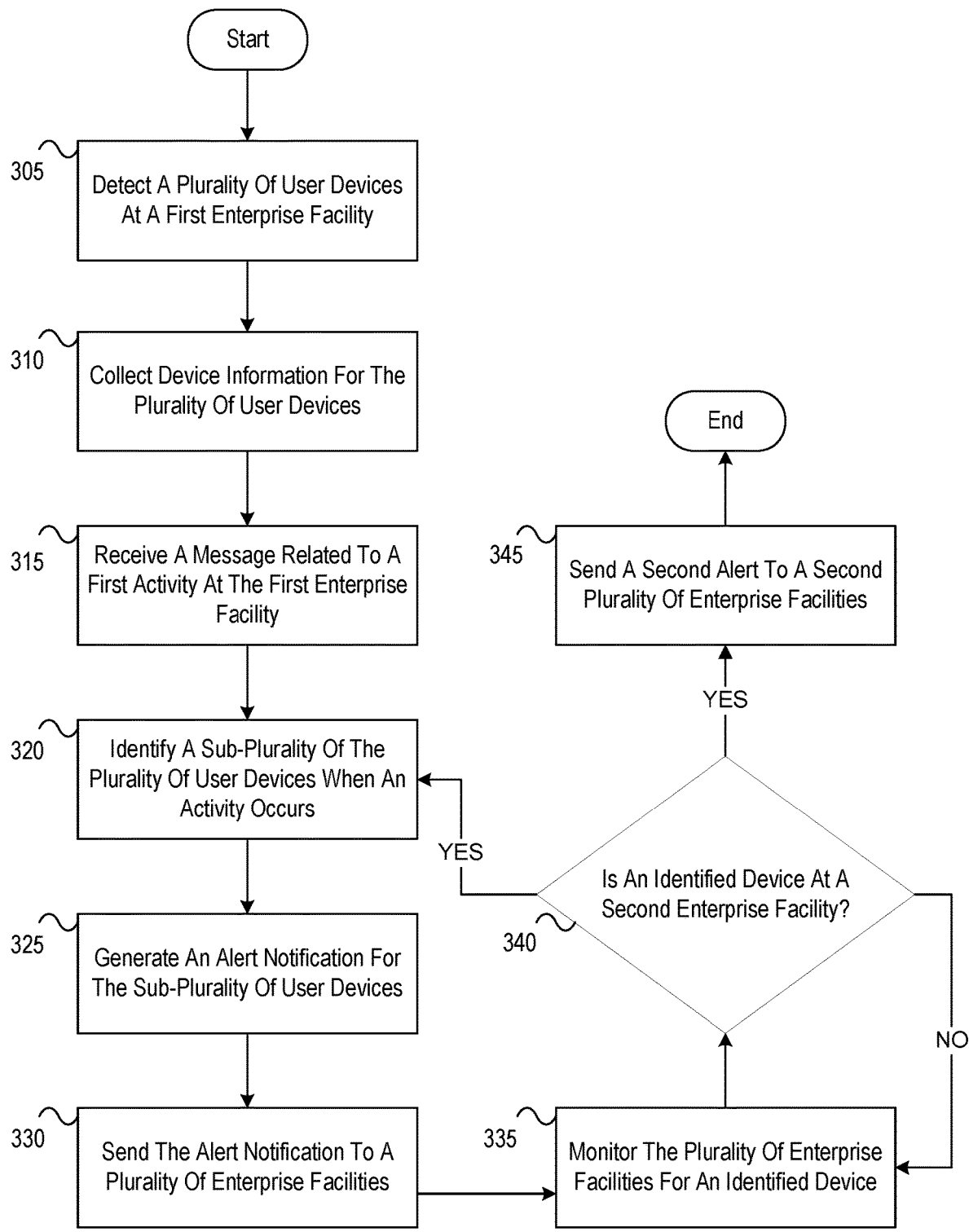
FIG. 3 depicts an illustrative method for utilizing a high generation cellular network for identifying devices associated with unauthorized activities and notifying enterprise facilities in accordance with one or more example embodiments.

FIG. 3 depicts an illustrative method for utilizing a high generation cellular network for identifying devices associated with unauthorized activities and notifying enterprise facilities in accordance with one or more example embodiments. Referring to FIG. 3, at step 305, a computing platform having at least one processor, a communication interface, and memory may detect, via the communication interface, a plurality of user devices at a first enterprise facility. At step 310, the computing platform may collect, via the communication interface, device information for the plurality of user devices. At step 315, the computing platform may receive, from an enterprise device at the first enterprise facility, a message related to a first activity at the first enterprise facility. At step 320, the computing platform may identify a sub-plurality of the plurality of user devices located at an enterprise facility at a time of occurrence of an activity. For example, in some embodiments, at step 320, the computing platform may, upon receiving the message, identify, based on the device information, a sub-plurality of the plurality of user devices, where the sub-plurality of user devices are located at the first enterprise facility at a time of occurrence of the first activity.

At step 325, the computing platform may generate, based on the message, an alert notification comprising information related to the first activity and device information for the sub-plurality of user devices. At step 330, the computing platform may send, via the communication interface, the alert notification to a collection of enterprise devices at a plurality of enterprise facilities. At step 335, the computing platform may monitor the plurality of enterprise facilities for at least one of the sub-plurality of user devices. At step 340, the computing platform may determine if the at least one of the sub-plurality of user devices is detected at a second enterprise facility of the plurality of enterprise facilities. If at step 340, the at least one of the sub-plurality of user devices is not detected at any of the plurality of enterprise facilities, the process returns to step 335. If at step 340, the at least one of the sub-plurality of user devices is detected at a second enterprise facility of the plurality of enterprise facilities, the process may proceed to step 320, and/or step 345. In some embodiments, after determining that the at least one of the sub-plurality of user devices is detected at a second enterprise facility, the computing platform may, at step 320, identify a second plurality of user devices located at the second enterprise facility, where the second plurality of user devices are proximate to the at least one of the sub-plurality of user devices (e.g., at a time of detection of the at least one of the sub-plurality of user devices at the second enterprise facility). In some embodiments, after determining that the at least one of the sub-plurality of user devices is detected at a second enterprise facility, the computing platform may, at step 345, send a second alert notification to a second collection of enterprise devices at a second plurality of enterprise facilities.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular time-sensitive tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   collect, via the communication interface, device information for a plurality of user devices at a first location;
   receive, from a first device at the first location, a message related to a first activity in a vicinity of the first location;
   upon receiving the message, identify, by the computing platform and based on the device information, a sub-plurality of the plurality of user devices, wherein the sub-plurality of the plurality of user devices is located at the first location at a time of occurrence of the first activity;
   generate, by the computing platform and based on the message, an alert notification comprising information related to the first activity and device information for the sub-plurality of user devices; and
   send, via the communication interface, the alert notification to a collection of devices at a plurality of locations.

2. The computing platform of claim 1, wherein the instructions, when executed by the at least one processor, cause the computing platform to:
   detect, by the computing platform and via the communication interface, and at a second time after the time of the occurrence of the first activity, at least one of the sub-plurality of the plurality of user devices at a second location of the plurality of locations; and
   based on the detecting, provide an alert message via a second device at the second location.

3. The computing platform of claim 2, wherein the instructions, when executed by the at least one processor, cause the computing platform to:
   determine, via the communication interface and within the second location, position data associated with the at least one of the sub-plurality of the plurality of user devices; and
   display the position data via a graphical user interface associated with the second device.

4. The computing platform of claim 2, wherein the instructions, when executed by the at least one processor, cause the computing platform to:
   based on the detecting, generate a second alert notification related to the at least one of the sub-plurality of the plurality of user devices; and
   send, via the communication interface, the second alert notification to a second collection of devices at a second plurality of locations.

5. The computing platform of claim 2, wherein the instructions, when executed by the at least one processor, cause the computing platform to:
   generate, based on the device information, a unique identifier for each user device of the plurality of user devices; and
   wherein detecting the at least one of the sub-plurality of the plurality of user devices at the second location is based on a unique identifier associated with the at least one of the sub-plurality of the plurality of user devices.

6. The computing platform of claim 2, wherein the alert message comprises instructions, for steps to be performed by a user of the second device, to prevent potential unauthorized activity at the second location.

7. The computing platform of claim 1, wherein identifying the sub-plurality of the plurality of user devices is based on a proximity of the sub-plurality of the plurality of user devices to a location of the first activity.

8. The computing platform of claim 1, wherein the instructions, when executed by the at least one processor, cause the computing platform to:
   determine a threat score for a particular device of the sub-plurality of the plurality of user devices, wherein the threat score is based at least in part on a number of times the particular device is detected at a location at a time of occurrence of an unauthorized activity.

9. The computing platform of claim 1, wherein the first location is a service location of a financial institution, and wherein the first activity is an unauthorized activity at the service location.

10. The computing platform of claim 1, wherein the communication interface is over a fifth generation cellular network.

11. The computing platform of claim 1, wherein the instructions, when executed by the at least one processor, cause the computing platform to:
    identify the plurality of locations based on a proximity to the first location.

12. The computing platform of claim 1, wherein the instructions, when executed by the at least one processor, cause the computing platform to:
    generate, based on device information, a digital forensic footprint for a particular user device of the plurality of user devices.

13. The computing platform of claim 1, wherein the instructions, when executed by the at least one processor, cause the computing platform to:
    identify, based on the message, a particular location previously visited by a particular user device of the plurality of user devices; and
    detect a previously undetected unauthorized activity at the particular location.

14. A method, comprising:
    at a computing platform comprising at least one processor, a communication interface, and memory:
    monitoring, via the communication interface, a plurality of user devices at a first location;
    receiving, from a first device at the first location, a message related to a first activity in a vicinity of the first location;

upon receiving the message, identifying, by the computing platform and based on the monitoring, a sub-plurality of the plurality of user devices, wherein the sub-plurality of the plurality of user devices is located at the first location at a time of occurrence of the first activity;

generating, by the computing platform and based on the message, an alert notification comprising information related to the first activity and device information for the sub-plurality of user devices; and sending, via the communication interface, the alert notification to a collection of devices at a plurality of locations.

15. The method of claim 14, further comprising:

detecting, by the computing platform and via the communication interface, and at a second time after the time of the occurrence of the first activity, at least one of the sub-plurality of the plurality of user devices at a second location of the plurality of locations; and based on the detecting, providing an alert message via a second device at the second location.

16. The method of claim 15, further comprising:

determining, via the communication interface and within the second location, position data associated with the at least one of the sub-plurality of the plurality of user devices; and display the position data via a graphical user interface associated with the second device.

17. The method of claim 14, further comprising:

identifying, based on the message, a particular location previously visited by a particular user device of the plurality of user devices; and detecting a previously undetected unauthorized activity at the particular location.

18. The method of claim 14, further comprising:

generating, based on device information for a particular user device of the plurality of user devices, a digital forensic footprint for the particular user device.

19. The method of claim 14, wherein the communication interface is over a fifth generation cellular network.

20. One or more non-transitory computer-readable media storing instructions that, when executed by a computing platform comprising at least one processor, a communication interface, and memory, cause the computing platform to:

collect, via the communication interface, device information for a plurality of user devices at a first enterprise facility;

receive, from a first device at a first location, a message related to a first activity in a vicinity of the first enterprise facility;

upon receiving the message, identify, by the computing platform and based on the device information, a sub-plurality of the plurality of user devices, wherein the sub-plurality of the plurality of user devices is located at the first enterprise facility at a time of occurrence of the first activity;

generate, by the computing platform and based on the message, an alert notification comprising information related to the first activity and device information for the sub-plurality of user devices; and send, via the communication interface, the alert notification to a collection of devices at a plurality of enterprise facilities.

* * * * *